(12) United States Patent
Kim et al.

(10) Patent No.: US 12,712,250 B2
(45) Date of Patent: Aug. 18, 2026

(54) CLAMPING APPARATUS FOR SUPPORT POLE OF RADIO UNIT

(71) Applicant: KMW INC., Hwaseong-si (KR)

(72) Inventors: Duk Yong Kim, Yongin-si (KR); Kyo Sung Ji, Hwaseong-si (KR); Chi Back Ryu, Hwaseong-si (KR); Min Sik Park, Hwaseong-si (KR); Hee Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 19/002,856

(22) Filed: Dec. 27, 2024

(65) Prior Publication Data

US 2025/0149770 A1 May 8, 2025

Related U.S. Application Data

(63) Continuation of application No. PCT/KR2023/008846, filed on Jun. 26, 2023.

(30) Foreign Application Priority Data

Jun. 28, 2022 (KR) ........................ 10-2022-0078597
Jun. 23, 2023 (KR) ........................ 10-2023-0081013

(51) Int. Cl.
*H01Q 1/12* (2006.01)
*F16B 2/08* (2006.01)

(52) U.S. Cl.
CPC ............. *H01Q 1/1228* (2013.01); *F16B 2/08* (2013.01)

(58) Field of Classification Search
CPC ...... H01Q 1/12; H01Q 1/1228; H01Q 1/1264; H01Q 1/246
See application file for complete search history.

(56) References Cited

U.S. PATENT DOCUMENTS 10,656,502 B1 5/2020 Sandoval
11,105,461 B2 8/2021 Dent et al.
(Continued)

FOREIGN PATENT DOCUMENTS

CN 114502849 A * 5/2022 .............. F16C 11/04
JP H02-67109 U 5/1990
(Continued)

OTHER PUBLICATIONS

International Search Report mailed on Sep. 25, 2023 for International Application No. PCT/KR2023/008846 and its English translation.

(Continued)

*Primary Examiner* — Hoang V Nguyen

(57) ABSTRACT

The present invention relates to a clamping apparatus for a support pole of a radio unit (RU) and, particularly, to a clamping apparatus s for a support pole of an RU comprising: a pole-side clamp, which is fixed to the support pole and has a locking hole recessed downward from the top thereof; and an RU-side clamp having the front end fixed to the RU, and having, at the rear end thereof, a locking pad inserted from the top toward the bottom into the locking hole of the pole-side clamp to be fixed therein, wherein the locking hole and the locking pad are inclined such that the front-to-back width gradually narrows in the direction of gravity, and thus the RU is easily attached to the support pole and each antenna device is easily oriented.

12 Claims, 17 Drawing Sheets

(56) References Cited

U.S. PATENT DOCUMENTS

| | | | | |
|---|---|---|---|---|
| 2017/0149115 | A1 | 5/2017 | Sierzenga et al. | |
| 2022/0104384 | A1* | 3/2022 | Chen | H04Q 1/14 |

FOREIGN PATENT DOCUMENTS

| | | | | | |
|---|---|---|---|---|---|
| JP | 2005-353724 | A | | 12/2005 | |
| JP | 2006-270574 | A | | 10/2006 | |
| JP | 2015115804 | A | * | 6/2015 | H01Q 1/12 |
| KR | 10-2007-0017088 | A | | 2/2007 | |
| KR | 10-2020-0111606 | A | | 9/2020 | |
| KR | 10-2020-0119699 | A | | 10/2020 | |
| WO | WO-2020190033 | A1 | * | 9/2020 | H01Q 3/08 |

OTHER PUBLICATIONS

Office Action mailed on Oct. 14, 2025 from Japanese Patent Office for Application No. 2024-573874.

European Search Report dated May 28, 2026 from European Patent Office for Application No. 23831838.0.

* cited by examiner 100A
250D
240D
100B
90RU
210A
251
250A
240A
230A
220A
205
210B
220B
230B
240B
"RU"
251
250B
250C
251
240C

CLAMPING APPARATUS FOR SUPPORT POLE OF RADIO UNIT

CROSS-REFERENCE TO RELATED APPLICATIONS

This application is a continuation application of International Application No. PCT/KR2023/008846, filed Jun. 26, 2023, which claims priority to and benefit of Korean Patent Applications Nos. 10-2022-0078597, filed Jun. 28, 2022; and 10-2023-0081013, filed Jun. 23, 2023 in the Korean Intellectual Property Office, the disclosures of which are incorporated herein by reference in their entirety.

TECHNICAL FIELD

The present disclosure relates to a clamping apparatus for the support pole of a radio unit, and more particularly, to a clamping apparatus for the support pole of a radio unit, which enables the radio unit to be easily attached to and detached from the support pole having various sizes.

BACKGROUND ART

In order to satisfy wireless data traffic demands that tend to increase after 4G communication system commercialization, efforts to develop an enhanced 5G communication system or a pre-5G communication system are being made. For this reason, the 5G communication system or the pre-5G communication system is called a "beyond 4G network communication system or a post LTE system". In order to achieve a high data transfer rate, an implementation of the 5G communication system in a mmWave band (e.g., a 60 Giga (60 GHZ) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming, and large scale antenna technologies have been discussed in the 5G communication system.

In particular, in a future 5G cellular network that requires a much greater capacity than a current capacity, various techniques that improve frequency efficiency may be applied. The service coverage area of a base station is called as a cell. In general, a base station having wide coverage along with high transmission power is called a macro cell. A small base station having narrow coverage with low transmission power is called a small cell.

In general, a base station, such as a macro cell or a small cell, is fabricated in the state in which at least one antenna module and a radio unit (hereinafter referred to as a "RU") have been physically separated from each other. In general, after each antenna module and each RU are connected by a cable, the antenna module and the RU are simultaneously mounted on one support pole.

In this case, at least one antenna module has a format for constructing a frequency band corresponding to a base station, and is implemented as an antenna board included in each antenna module. Two antenna modules having a dual band form, for covering frequency bands corresponding to depart of defense (DoD) and citizens broadband radio services (CBRS) may be adopted.

In this case, in order to form different antenna beamforming according to the characteristics of a base station, after each antenna module is combined with a support pole, the predetermined directivity of the antenna module needs to be adjusted. Conventionally, there are problems in that a space necessary for the adjustment of the directivity is further required and a fine view is degraded because the cable that connects the RU and the antenna module is exposed to the outside if the directivity of the antenna module is adjusted along the RU.

DISCLOSURE

Technical Problem

The present disclosure has been contrived to solve the technical problems, and an object of the present disclosure is to provide a clamping apparatus for the support pole of a radio unit, which enables the radio unit to be easily attached to and detached from the support pole.

Furthermore, an object of the present disclosure is to provide a clamping apparatus for the support pole of a radio unit in which the directivity of multiple antenna modules of a base station can be easily adjusted.

Furthermore, an object of the present disclosure is to provide a clamping apparatus for the support pole of a radio unit, which can prevent an outward appearance outside the support pole from being degraded by sublating the exposure of a cable that electrically connects the radio unit and an antenna module.

Technical objects of the present disclosure are not limited to the aforementioned objects, and the other objects not described above may be evidently understood from the following description by those skilled in the art.

Technical Solution

A clamping apparatus for the support pole of a radio unit according to an embodiment of the present disclosure may include a pole-side clamp fixed to a support pole and having a locking hole concavely formed downward from an upper surface thereof, and a radio unit (RU)-side clamp having a front part fixed to a RU and having a locking pad, which is inserted into a locking hole of the pole-side clamp from top to bottom and then fixed thereto, formed at the rear part thereof. The thickness of the locking pad in front and rear directions thereof is slantly formed so that the front and rear width of the thickness is gradually narrowed in a direction of gravity.

In this case, the locking hole may be formed to have an inner surface having a plane form. The locking pad may be formed to have a curved surface having a parabola form.

Furthermore, the pole-side clamp may be provided in the support pole as a pair so that the pair of pole-side clamps is isolated from each other up and down through a medium of hose band clamps.

Furthermore, a band fixing hole into which the hose band clamp is horizontally inserted therethrough may be formed in the rear parts of the pair of pole-side clamps.

Furthermore, a gear panel assembly in which at least two gear teeth clamped with the outer circumferential surface of the support pole has been formed may be combined with each of the upper and lower sides of the rear parts of the pair of pole-side clamps.

Furthermore, the gear panel assembly may include at least one clamping gear panel having the at least two gear teeth formed therein and having the two or more gear teeth provided to be exposed toward the support pole, and a gear fixing panel that fixes the clamping gear panel to the top and bottom of the pole-side clamp.

Furthermore, the clamping gear panel may be installed in a clamping gear panel 1 installation groove that is concavely formed on each of the upper and lower sides of the rear parts of the pole-side clamps. The gear fixing panel may be installed in a fixed panel installation groove that is concavely formed on each of the upper and lower sides of the rear parts of the pole-side clamps so that the gear fixing panel includes the clamping gear panel installation groove.

Furthermore, the clamping gear panel may be horizontally rotatably provided in the clamping gear panel installation groove. The gear panel assembly may further include a gear adjustment pin that is fixed to the clamping gear panel installation groove through the clamping gear panel in order to restrict the rotation of the clamping gear panel.

Furthermore, a pin slot through which a gear adjustment pin penetrates may be formed in the clamping gear panel in an arc form so that the pin slot has an identical radius. The location of the gear teeth may be adjusted within the range of the length of the pin slot.

Furthermore, the gear fixing panel may be screwed and fixed to a fixed panel installation groove so that the gear fixing panel covers the clamping gear panel in the state in which the clamping gear panel has been fixed to the clamping gear panel installation groove.

Furthermore, the clamping apparatus may further include a clamping bolt that is bolted and fastened within the pole-side clamp corresponding to a lower part of the locking hole of the pole-side clamp through the locking pad on an upper surface of the locking pad of the RU-side clamp.

Furthermore, when a bolting fastening force of the clamping bolt is delivered, a lateral surface of the locking pad may be forcedly fitted into the incline of the locking hole so that shapes of the lateral surface and the incline are matched.

Advantageous Effects

The clamping apparatus for the support pole of a radio unit according to an embodiment of the present disclosure may achieve the following various effects.

First, there is an effect in that the radio unit can be conveniently detachably installed at a desired height of the support pole through the medium of the hose band clamp.

Second, there is an effect in that beamforming performance can be improved because multiple antenna modules capable of covering a dual band frequency band can be installed with respect to the radio unit.

Third, it is possible to prevent an outward appearance near the support pole from being degraded because the exposure of the cable that connects the radio unit and multiple antenna modules to the outside is sublated.

DESCRIPTION REFERENCE NUMERALS

Figure 1A:
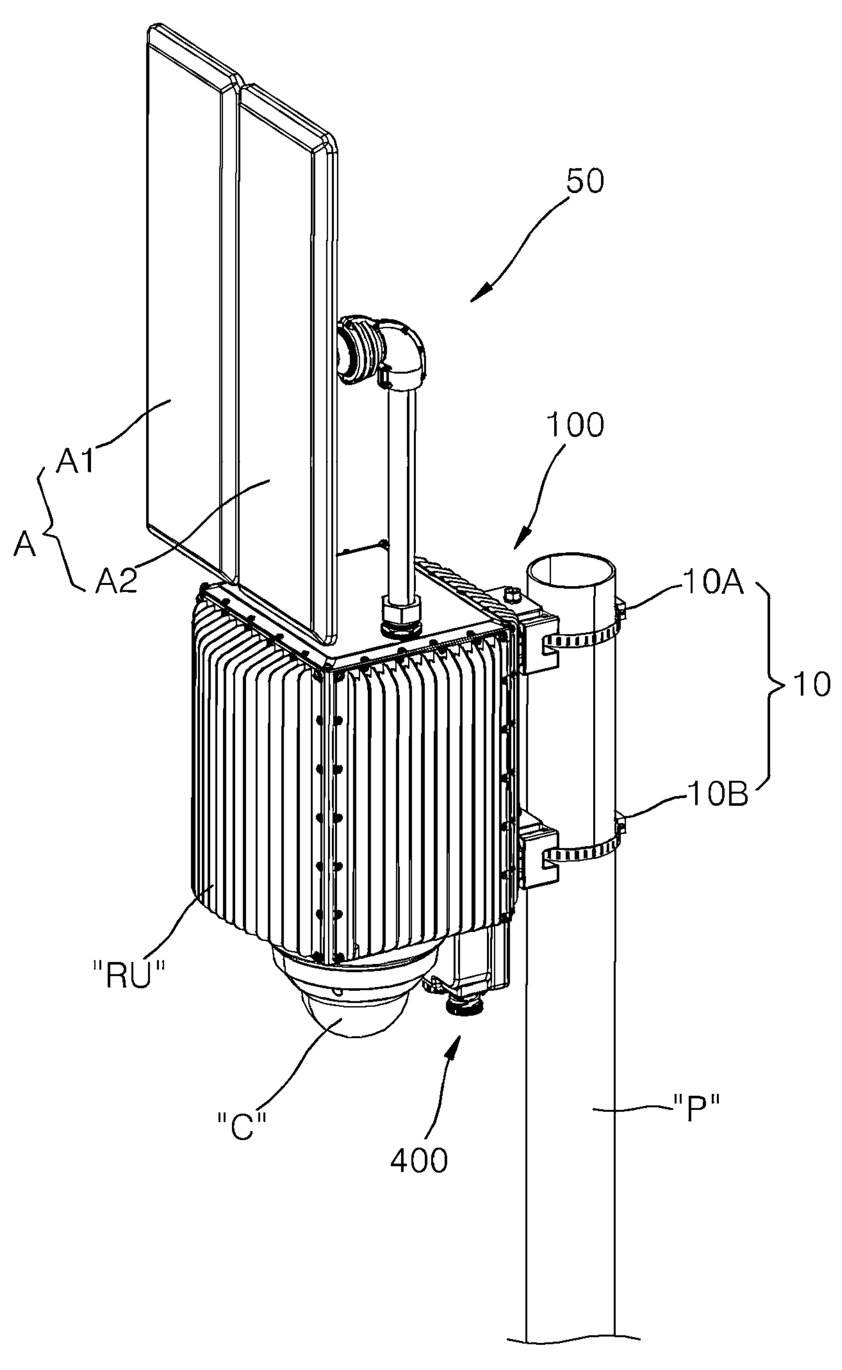
FIGS. 1A and 1B are perspective views illustrating the state in which a RU is installed in a support pole by using a clamping apparatus for the support pole of a radio unit according to an embodiment of the present disclosure.

RU: radio unit A1, A2: antenna module
10A, 10B: hose band clamp 100: clamping apparatus
110: pole-side clamp 111: locking hole
112: bolting fastening boss 113-1: fixed panel installation groove
113-2: clamping gear panel installation groove 114: screw
115: gear fixing panel 116: clamping gear panel
117: band fixing hole 118: adjustment pin
119: pin slot 120: RU-side clamp
121: locking pad 123: bolt fastening hole
125: bolt through hole 127: fixing bolt
130: clamping bolt 131: male thread

BEST MODEL

Hereinafter, a clamping apparatus for the support pole of a radio unit according to an embodiment of the present disclosure is described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

In describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having ideal or excessively formal meanings unless explicitly defined otherwise in the specification.

Figure 1B:
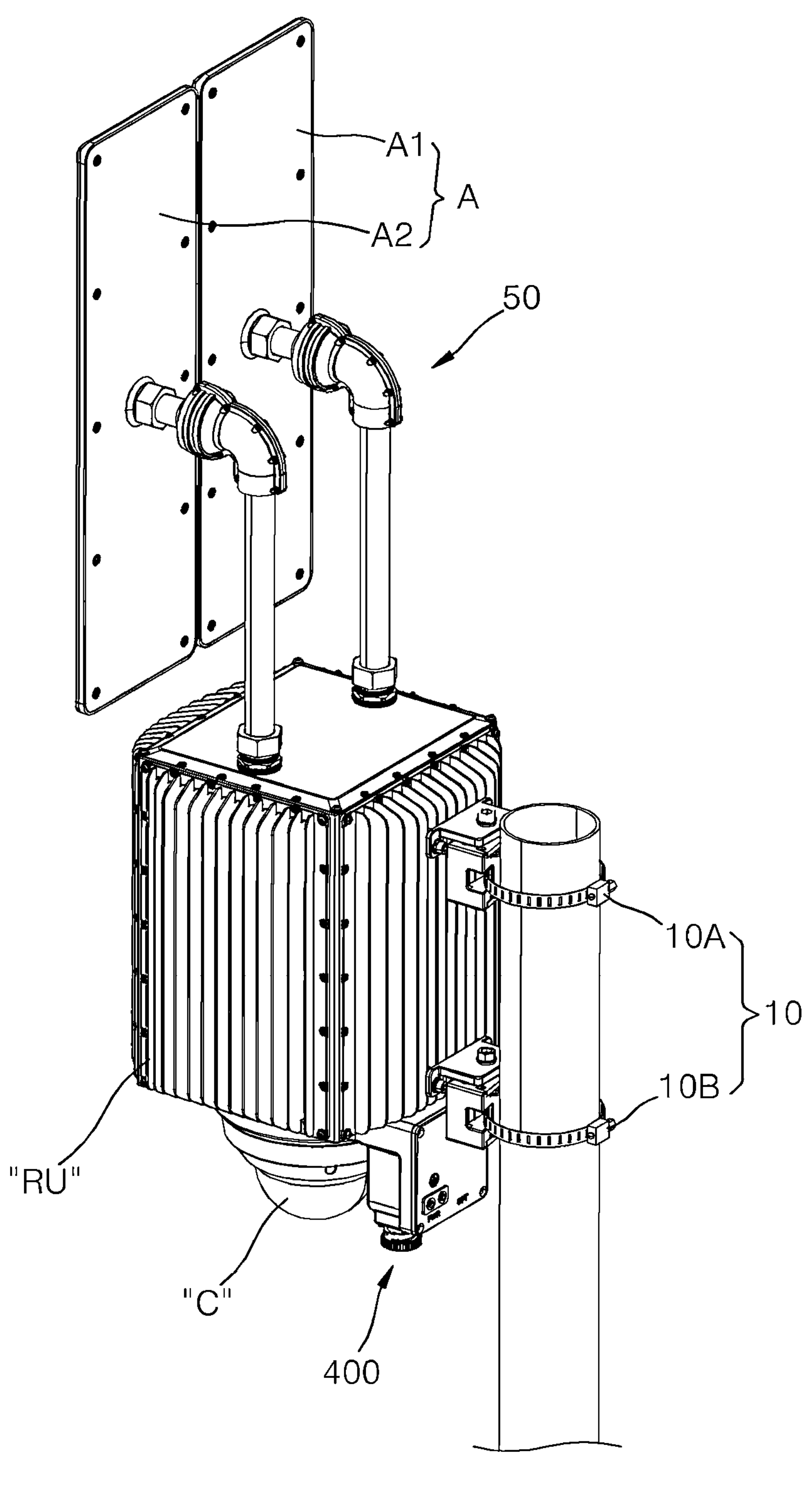
Figure 2A:
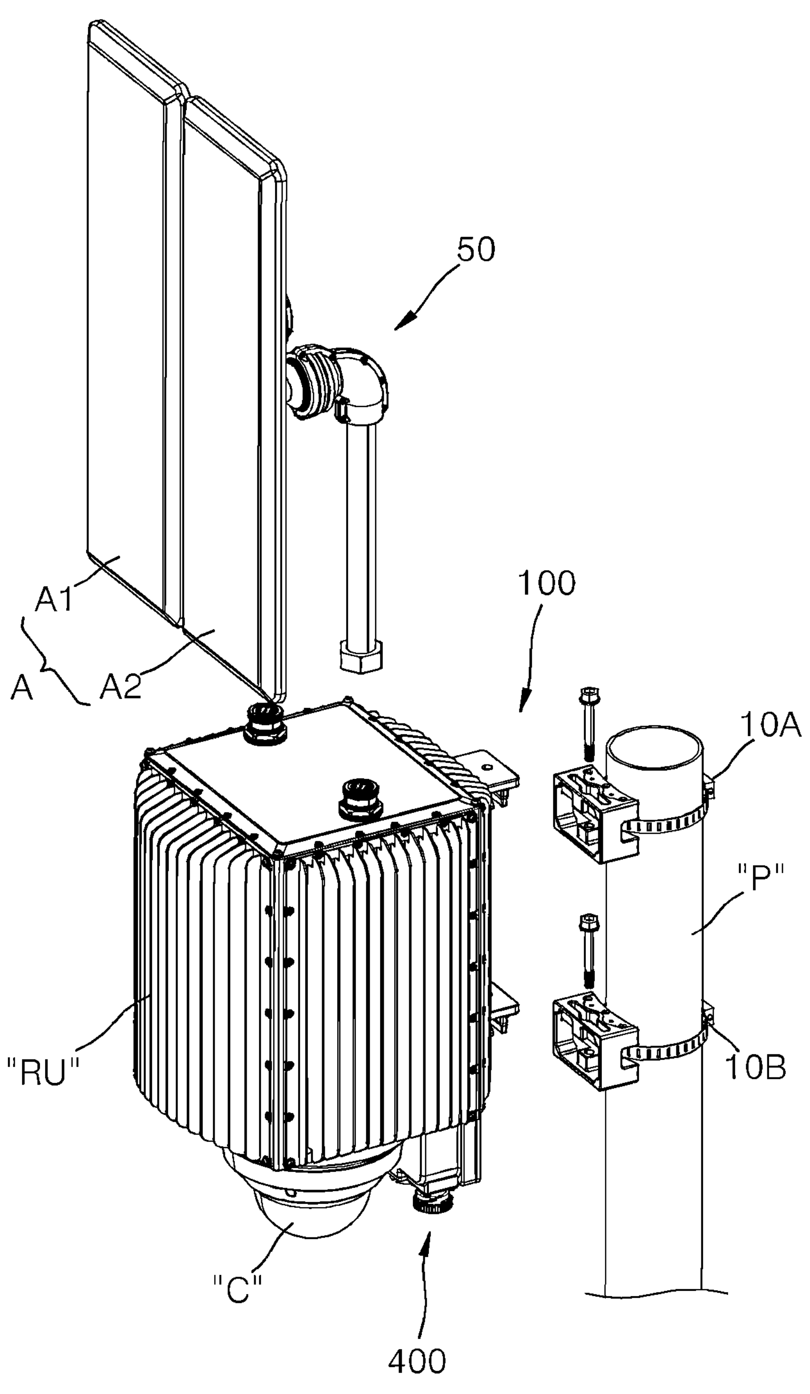
FIGS. 2A and 2B are exploded perspective views of FIGS. 1A and 1B.
Figure 2B:
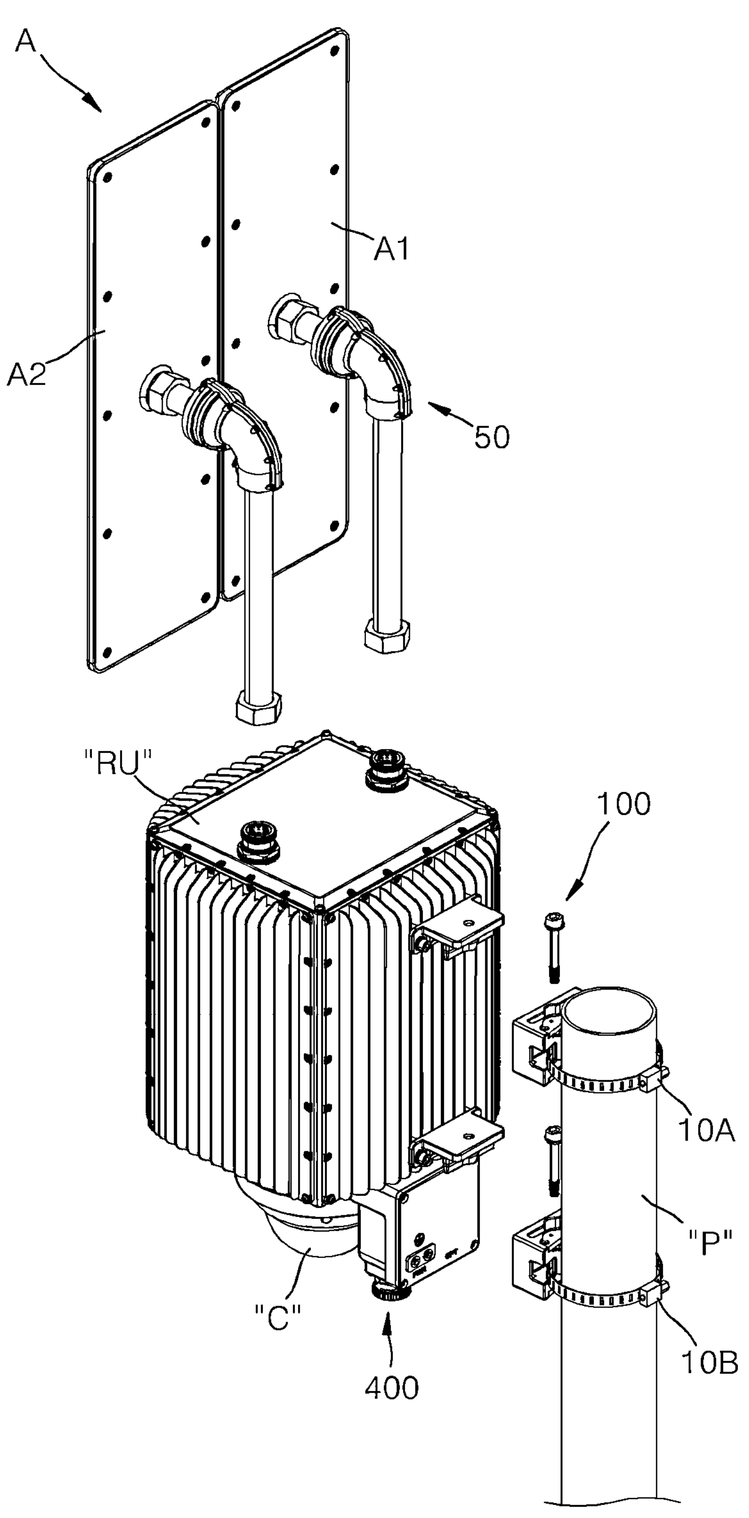
Figure 3:
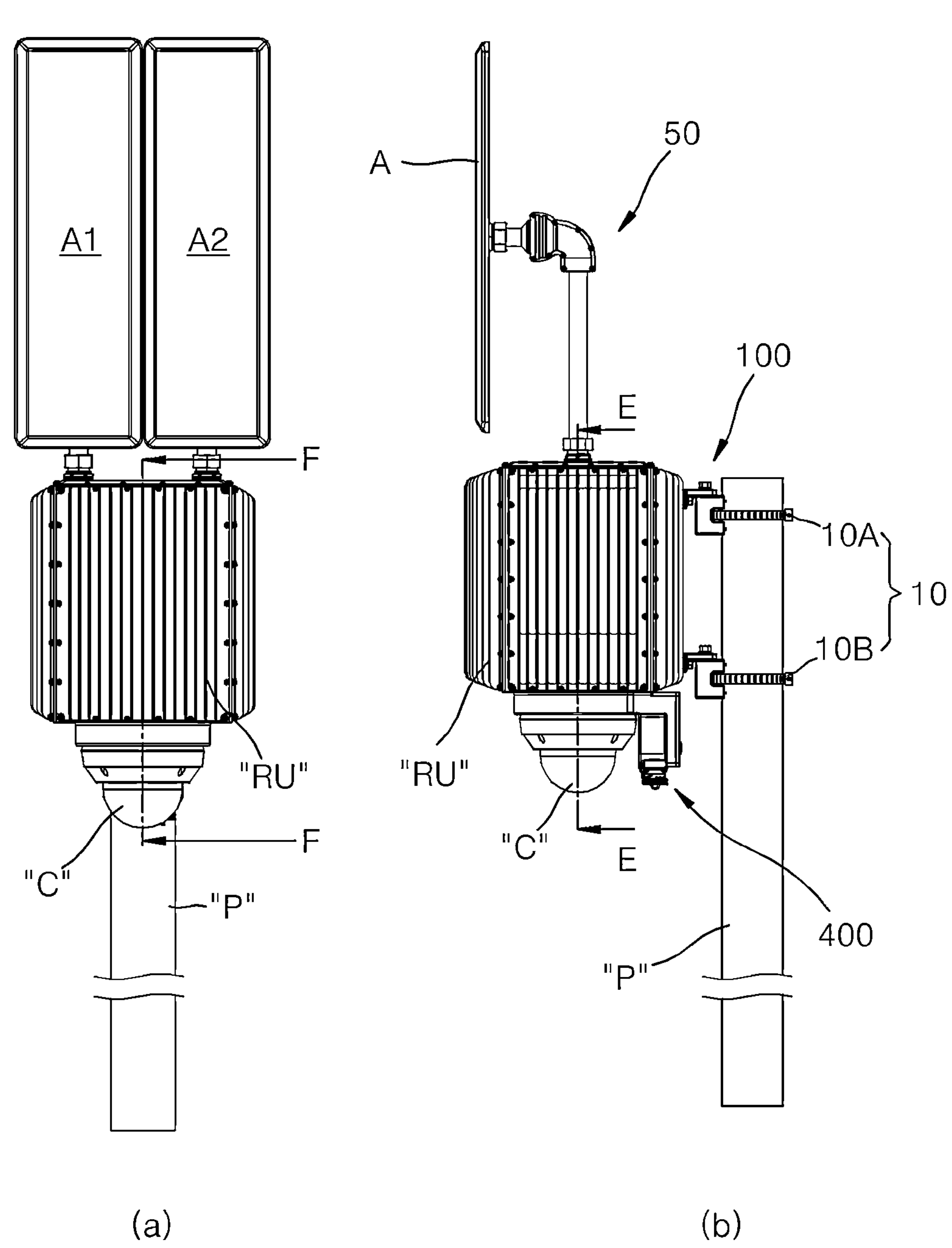
FIG. 3 is a front view (a) and side view (b) of FIG. 1A.
Figure 4:
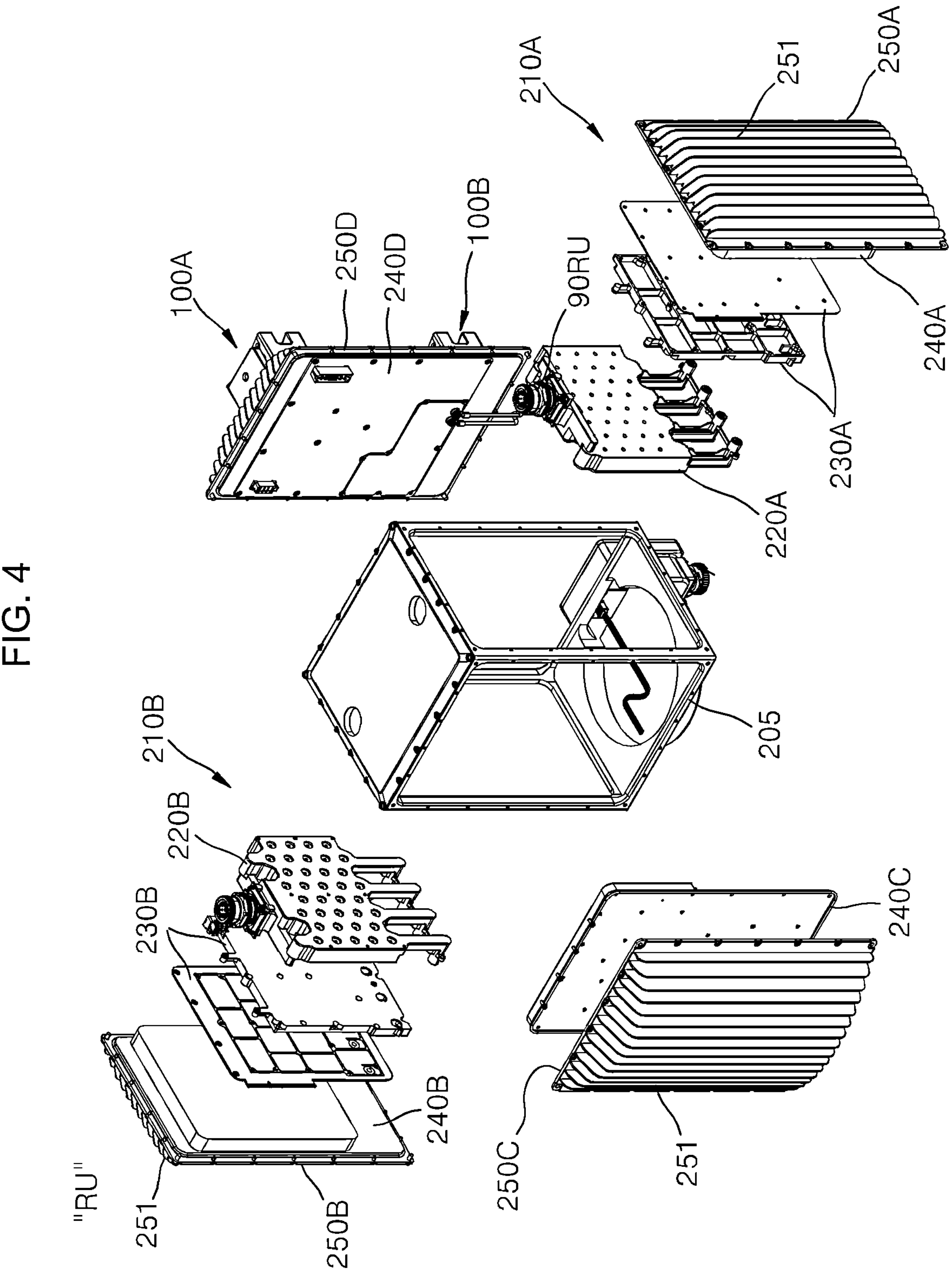
FIG. 4 is an exploded perspective view illustrating the RU among the components of FIG. 1A.
Figure 5:
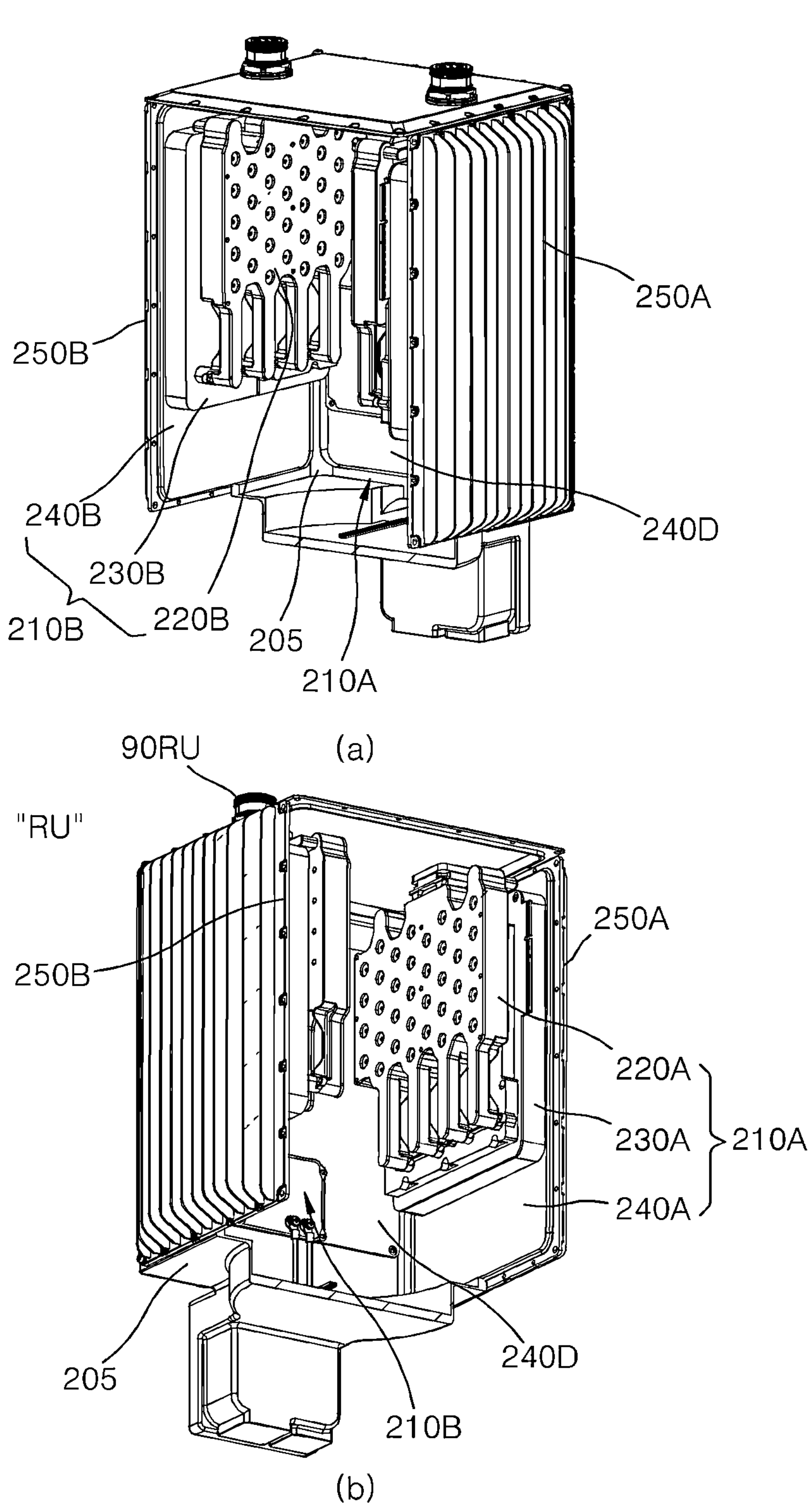
FIG. 5 is a partially cut perspective view taken along line E-E in FIG. 3.
Figure 6:
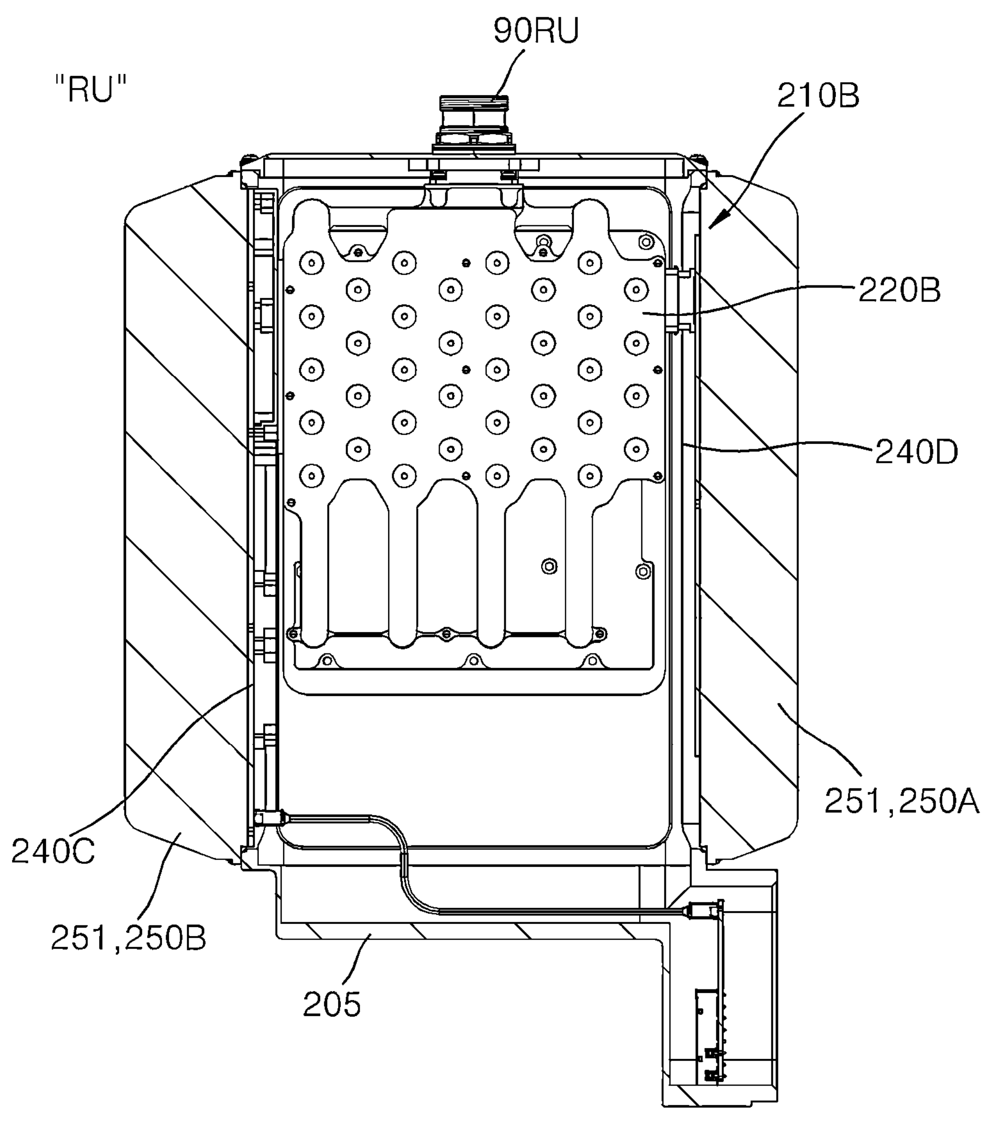
FIG. 6 is a cross-sectional view taken along line F-F in FIG. 3.

FIGS. 1A and 1B are perspective views illustrating the state in which a RU is installed in a support pole by using a clamping apparatus for the support pole of a radio unit according to an embodiment of the present disclosure. FIGS. 2A and 2B are exploded perspective views of FIGS. 1A and 1B. FIG. 3 is a front view (a) and side view (b) of FIG. 1A. FIG. 4 is an exploded perspective view illustrating the RU among the components of FIG. 1A. FIG. 5 is a partially cut perspective view taken along line E-E in FIG. 3. FIG. 6 is a cross-sectional view taken along line F-F in FIG. 3.

As reference in FIGS. 1A to 6, a clamping apparatus 100 for the support pole of a radio unit according to an embodiment of the present disclosure performs a role of mediating the installation of a base station for a support pole P.

In general, the base station may include a radio unit (hereinafter referred to as an "RU") and two more antenna modules A (A1 and A2) that are controlled by the RU and that cover at least a dual band frequency band.

For example, multiple radiation element modules (not illustrated) are installed in each of the two antenna modules A1 and A2. Each of the multiple radiation element modules has a format for constructing a frequency band corresponding to a small cell base station. Multiple radiation element modules for covering a frequency band corresponding to depart of defense (DoD) may be disposed in the antenna module A1 on one side of the two antenna modules. Multiple radiation element modules for covering a frequency band correspond to citizens broadband radio services (CBRS) may be disposed in the antenna module A2 on the other side of the two antenna modules.

The two antenna modules A1 and A2 provided as described above can each implement the best beamforming because the directivity of each of the two antenna modules is adjusted by using a multi-function link 50 described later in a direction in which coverage requirement values are strong when the each antenna module is mounted on an RU.

However, radiation element modules having the same frequency bands do not need to be essentially arranged in each of the antenna modules A1 and A2. Although not illustrated, multiple antenna sub arrays by multiple radiation elements may be arranged over the front surface of an antenna board (not illustrated) for macro, which is provided within one antenna module A1 or A2, so that a gain of 17.5 dBI is implemented by implementing a DoD channel having a 3450 to 3550 MHZ frequency band of a dual frequency band. Multiple antenna sub arrays by multiple radiation elements may be arranged on under the front surface of the antenna board for macro so that a gain of 15.5 dBI is implementing a CBRS channel having a 3550 to 3700 MHZ frequency band of the dual frequency band.

If a radiation element module is arranged so that one antenna module A1 or A2 covers the entire dual band frequency band as described above, although the directivity of the corresponding antenna module A1 or A2 is identically adjusted, uplink (UL) coverage attributable to the separation of TRx for each band and an antenna sub array can be maximized.

In this case, as reference in FIGS. 4 to 6, the RU includes a housing body 205 provided in an approximately rectangular parallelepiped shape and having an internal space the remaining part of which except an upper surface and a lower surface has been opened. A first band RF part 210A and a second band RF part 210B may be installed in the internal space of the housing body 205 by being isolated from each other.

The first band RF part 210A may be defined to be related to a CBRS channel, among the two frequency bands. The second band RF part 210B may be defined to be related to a DoD channel, among the two frequency bands.

More specifically, the first band RF part 210A may include a CBRS filter 220A embedded in a left part of the internal space of the housing body 205 and a CBRS PAU 240A stacked on the outside of the CBRS filter 220A with a clamshell panel 230A interposed therebetweeen.

Furthermore, the second band RF part 210B may include a DoD filter 220B embedded in a right part of the internal space of the housing body 205 and a DOD PAU 240B stacked on the outside of the DoD filter 220B with a clamshell panel 230B interposed therebetween.

A DTA board 240C and a PSA board 240D that are involved in the first band RF part 210A and the second band RF part 210B in common may be disposed at the front and rear parts of the internal space of the housing body 205, respectively.

Furthermore, the RU may further include a right PAU housing cover 250A, a left PAU housing cover 250B, a front DTA housing cover 250C, and a rear PSA housing cover 250D provided to shield the opened four surfaces of the housing body 205, respectively.

For reference, the clamping apparatus 100 for the support pole of a radio unit, which is described later, according to an embodiment of the present disclosure may be combined with the rear PSA housing cover 250D, among the components of the RU.

Meanwhile, the CBRS PAU 240A, among the components of the first band RF part 210A, the DOD PAU 240B, among the components of the second band RF part 210B, the DTA board 240C, and the PSA board 240D are elements each of which plays a role as a kind of main board. A heat dissipation element not illustrated is mounted on the lateral surface of each of the elements. Each of the right PAU housing cover 250A, the left PAU housing cover 250B, the front DTA housing cover 250C, and the rear PSA housing cover 250D may perform a role of discharging heat, which is generated from the heat dissipation element mounted on the lateral surface of each element, through each surface of the housing body 205.

Therefore, the right PAU housing cover 250A, the left PAU housing cover 250B, the front DTA housing cover 250C, and the rear PSA housing cover 250D is made of a metal material having excellent heat conductivity. It is preferred that multiple heat sink pins 251 are integrally formed on each lateral surface. Accordingly, heat that is generated from the CBRS PAU 240A, the DOD PAU 240B, the DTA board 240C, and the PSA board 240D can be discharged in all directions except the upper and lower part of the housing body.

Furthermore, the two or more antenna modules A1 and A2 described later may be combined with the upper surface of the housing body 205. CCTV C that photographs low surroundings in real time may be installed on the lower surface of the housing body 205.

Furthermore, an external mounting member 400 for an external cable connection with the RU may be provided on the lower surface of the housing body 205. Although not illustrated in the drawing, after being hidden and arranged through the inside of the support pole P, an external cable may be connected to the external mounting member 400 in the state in which the exposure of the external cable to the outside has been minimized through a cable installation hole (not illustrated) that is formed in the support pole P of a portion close to the external mounting member 400.

Therefore, according to the clamping apparatus 100 for the support pole of a radio unit according to an embodiment of the present disclosure, the external cable that connects the support pole P and the RU are connected in the state in which the exposure of the external cable to the outside has been minimized as described above. In contrast, multiple cables 60 are arranged in the state in which the RU and each of the antenna modules A1 and A2 are arranged so that the RU and each of the antenna modules are not exposed to the outside through the cable accommodation pipe 57 of the multi-function link 50 described later. Accordingly, the degradation of an outward appearance can be prevented.

Figure 7:
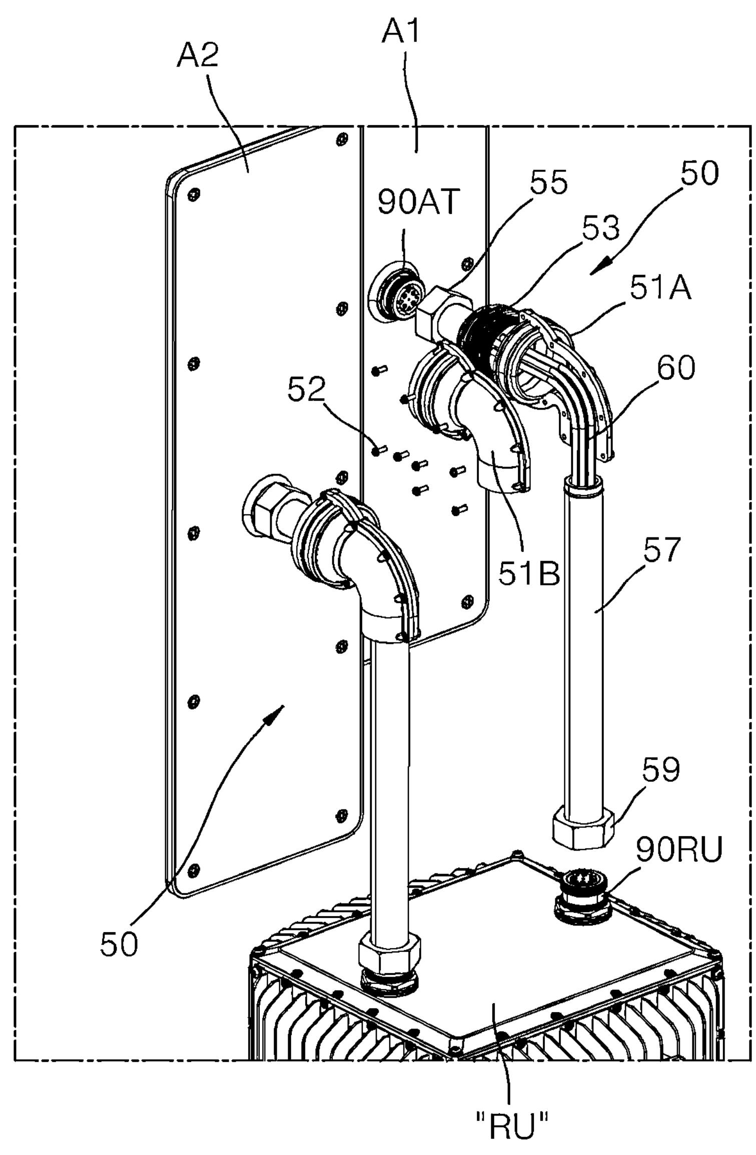
FIG. 7 is a perspective view illustrating a form of an antenna module connected to an RU through the medium of a multi-function link, among the components of FIG. 1A, and is an exploded perspective view of a part thereof.

FIG. 7 is a perspective view illustrating a form of the antenna module connected to the RU through the medium of the multi-function link, among the components of FIG. 1A, and is an exploded perspective view of a part thereof.

As reference in FIG. 7, the two or more antenna modules A1 and A2 may each be electrically connected to the RU through the medium of the multi-function link 50.

As reference in FIG. 7, the multi-function link 50 may perform a role of connecting an RU-side female connector 90RU and an antenna-side female connector 90AT and also preventing interference with a surrounding antenna module while being efficiency so that a location to which the front of each of the antenna modules A1 and A2 is directed can be adjusted (directivity adjust).

More specifically, the multi-function link 50 may include fixing parts 51A and 51B fixed to the RU-side female connector 90RU through the medium of the cable accommodation pipe 57 and a ball joint part 53 having one end connected to the fixing parts 51A and 51B in a way to be jointed and movable and the other end connected to the antenna-side female connector 90AT.

The multiple cables 60 that connect the RU and each of the antenna modules A1 and A2 are hidden and arranged from the outside through the inside of the cable accommodation pipe 57, the fixing parts 51A and 51B, and the ball joint part 53. Male connectors (not illustrated) may be provided at the ends of the cables 60, respectively, and may be electrically connected to the RU-side female connector 90RU and the antenna-side female connector 90AT.

Furthermore, retainer nuts 59 and 55 may be provided at the end of the cable accommodation pipe 57 and the end of the ball joint part 53, respectively. The retainer nut 59 provided in the state in which the retainer nut has been fit into the end of the cable accommodation pipe 57 is fastened to a male thread (reference numeral not indicated) formed in the outer circumferential surface of the RU-side female connector 90RU. The retainer nut 55 provided in the state in which the retainer nut has been fit into the end of the ball joint part 53 is fastened to a male thread (reference numeral not indicated) formed in the outer circumferential surface of the antenna-side female connector 90AT. Accordingly, each terminal pin (not illustrated) of the male connector (not illustrated) may be connected to each of the RU-side female connector 90RU and the antenna-side female connector 90AT, thereby maintaining electrical connectivity.

As described above, the multi-function link 50 provides a great advantage in constructing a base station because the multi-function link enables each of the two antenna modules A1 and A2, which are provided in a dual band form so that at least two frequency bands can be covered with respect to the RU, to be electrically connected thereto without the exposure of an outward appearance of the cables 60 and the directivity of the antenna module can be adjusted through the ball joint part 53 in a proper direction for beamforming.

Meanwhile, as reference in FIGS. 1A to 3, the RU with which the two or more antenna modules A1 and A2 can be combined may be detachably mounted on the support pole P through the medium of the clamping apparatus 100 for the support pole of a radio unit according to an embodiment of the present disclosure.

Figure 8:
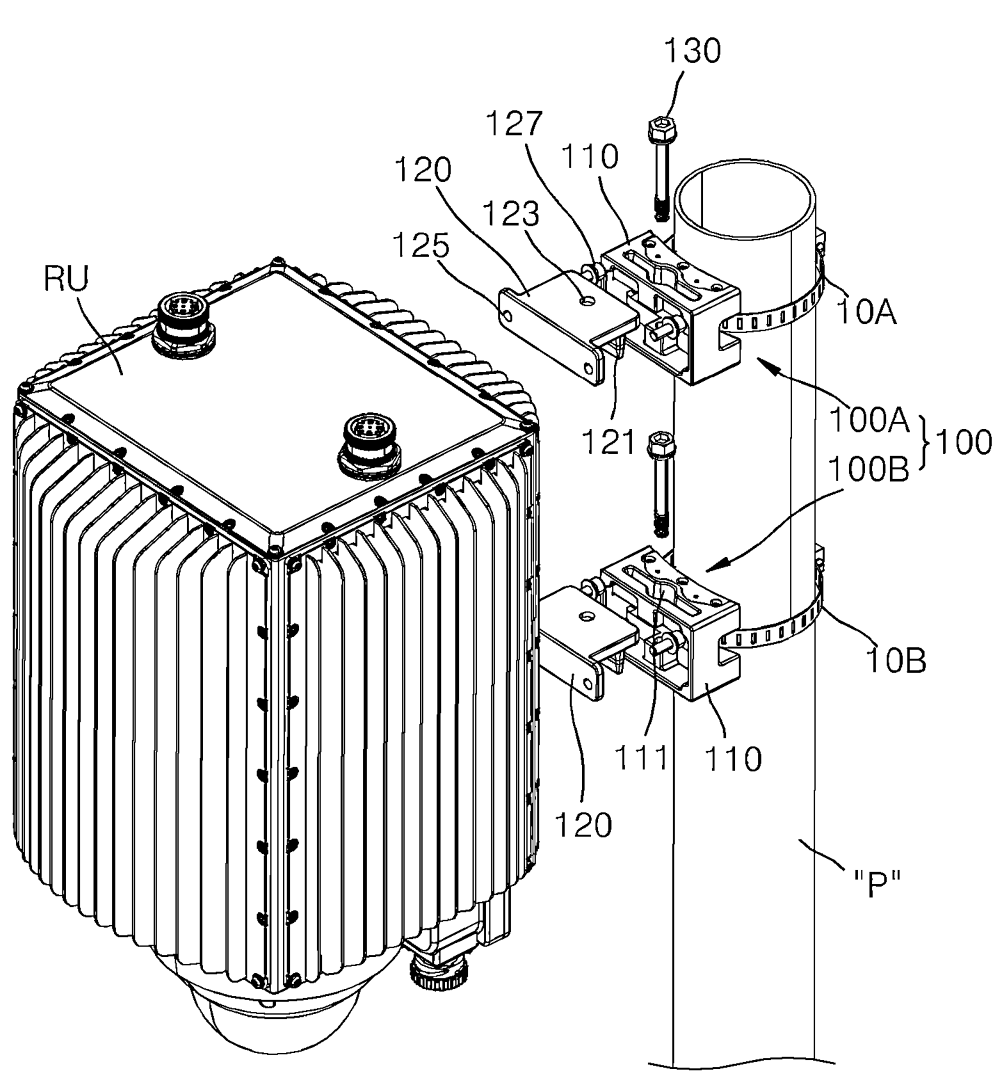
FIGS. 8 and 9 are exploded perspective views illustrating a form in which the RU has been installed by using the clamping apparatus for the support pole of a radio unit according to an embodiment of the present disclosure.
Figure 9:
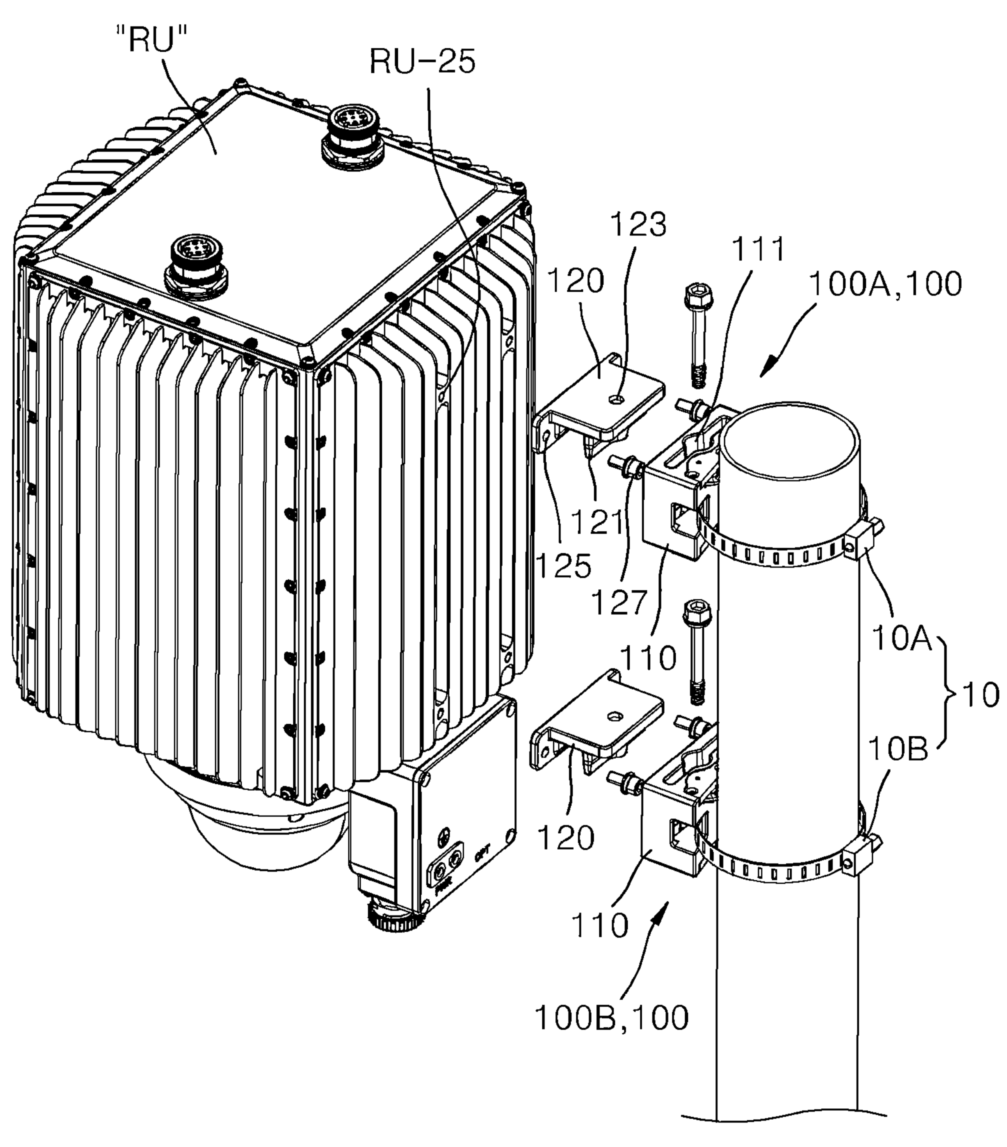
Figure 10:
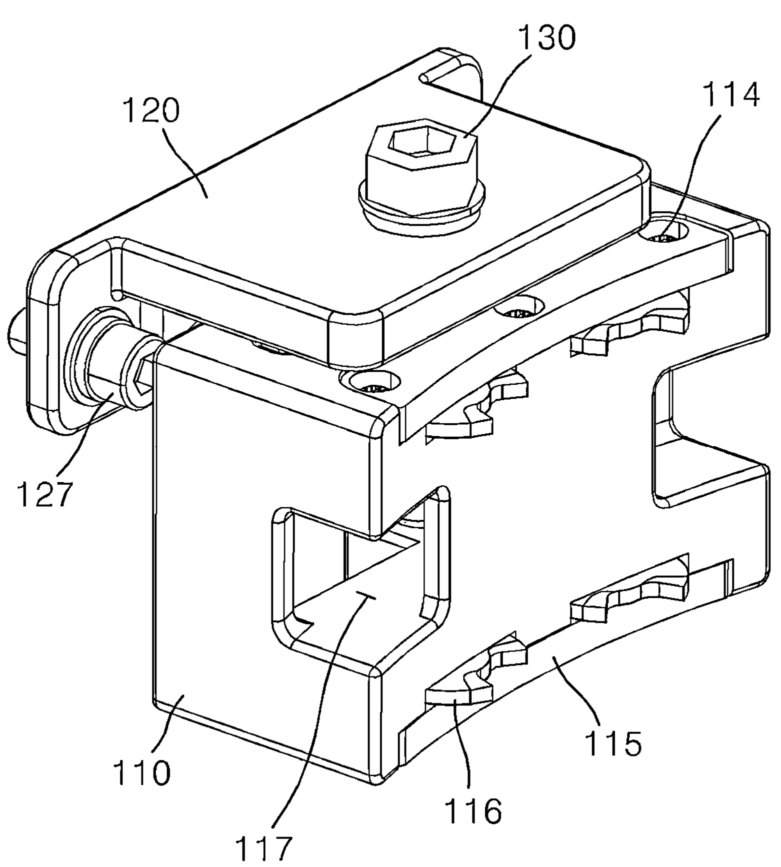
FIG. 10 is a perspective view illustrating a clamping apparatus for the support pole of a radio unit according to an embodiment of the present disclosure.
Figure 11:
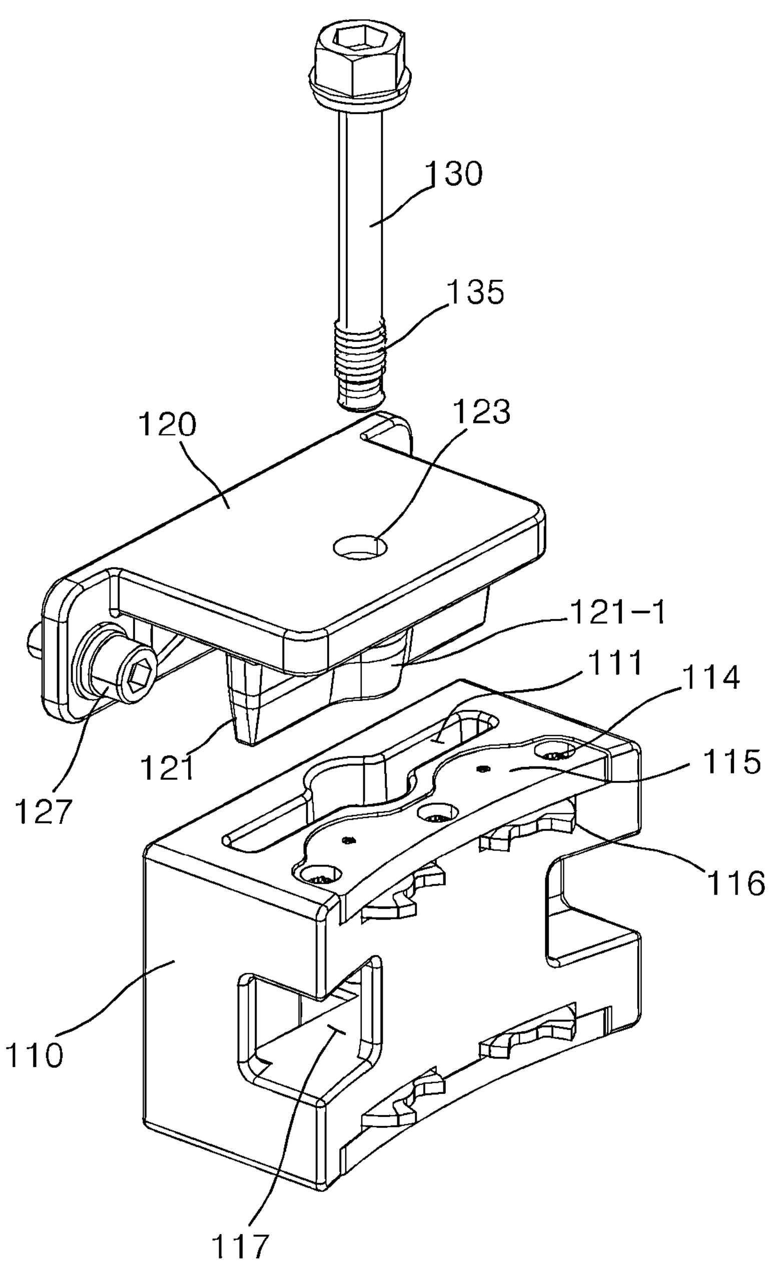
FIGS. 11 and 12 are detailed exploded perspective views of FIG. 10.
Figure 12:
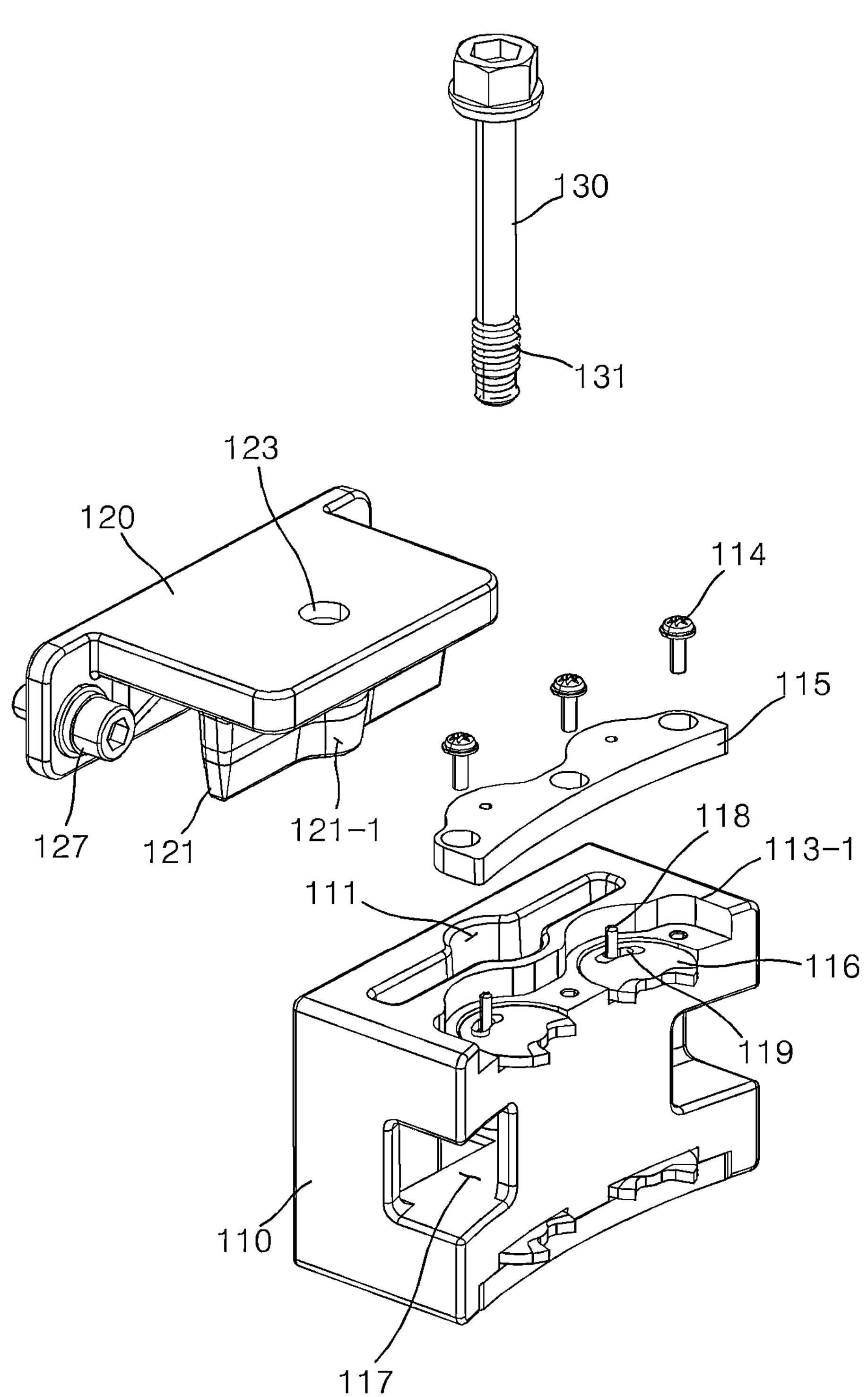
Figure 13:
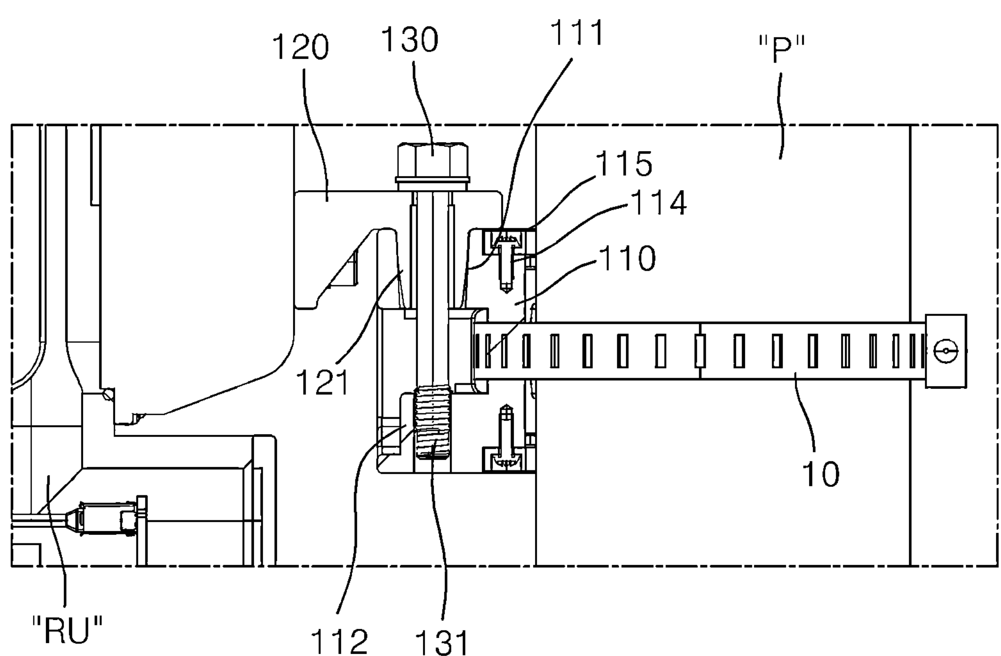
FIG. 13 is a partial cross-sectional view illustrating a form in which the clamping apparatus for the support pole of a radio unit according to an embodiment of the present disclosure has been mounted on a support pole.
Figure 14:
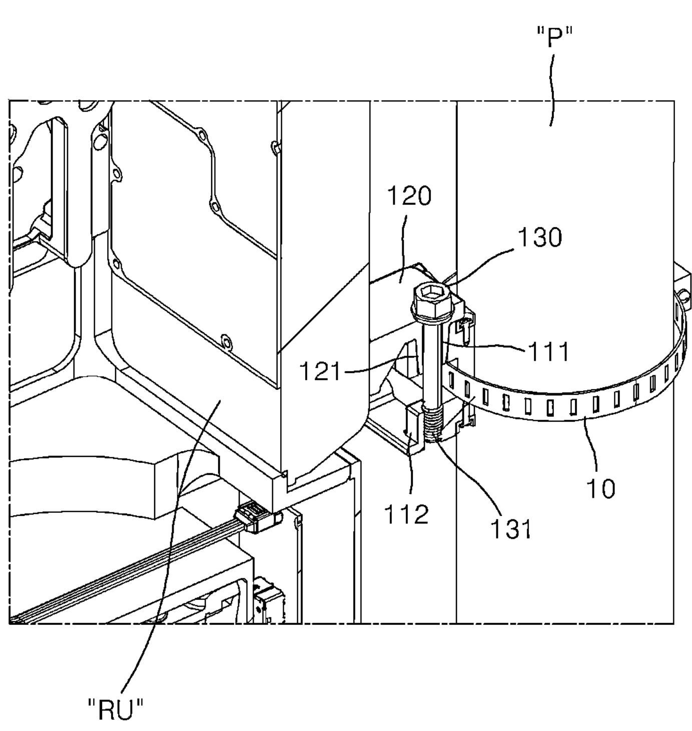
FIG. 14 is a perspective view of FIG. 13.

FIGS. 8 and 9 are exploded perspective views illustrating a form in which the RU has been installed by using the clamping apparatus for the support pole of a radio unit according to an embodiment of the present disclosure. FIG. 10 is a perspective view illustrating the clamping apparatus for the support pole of a radio unit according to an embodiment of the present disclosure. FIGS. 11 and 12 are detailed exploded perspective views of FIG. 10. FIG. 13 is a partial cross-sectional view illustrating a form in which the clamping apparatus for the support pole of a radio unit according to an embodiment of the present disclosure has been mounted on the support pole. FIG. 14 is a perspective view of FIG. 13.

As reference in FIGS. 8 to 14, the clamping apparatus 100 for the support pole of a radio unit according to an embodiment of the present disclosure may include an upper clamp 100A that is disposed in a relatively upper part of the support pole P and a lower clamp 100B that is disposed in a relatively lower part of the support pole P. In this case, the concept in which a part of the support pole is the relatively upper part or the relatively lower part is not set on the basis of the upper and lower of the support pole P, but is for merely defining upper and lower locations between the upper clamp 100A and the lower clamp 100B and the scope of rights of the present disclosure should not be limited thereby.

Hereinafter, the upper clamp 100A and the lower clamp 100B have the same components. Only the components of any one of the upper clamp 100A and the lower clamp 100B are described in detail for convenience of description, and a description of the components of the other thereof is omitted or replaced.

The clamping apparatus 100 for the support pole of a radio unit according to an embodiment of the present disclosure includes a pole-side clamp 110 that is fixed to the support pole P and that has a locking hole 111 concavely formed downward from an upper surface thereof and an RU-side clamp 120 that has a front part fixed to the RU and has a locking pad 121, which is inserted into the locking hole 111 of the pole-side clamp 110 from top to bottom and then fixed thereto, formed at a rear part thereof.

In this case, it is preferred that each of the locking hole 111 and the locking pad 121 is slantly formed so that a front and read width thereof is gradually narrowed in the direction of gravity.

Meanwhile, the pole-side clamp 110 may be provided as a pair in the support pole P so that the pair of pole-side clamps are isolated from each other up and down through the medium of hose band clamps 10A and 10B.

If the pole-side clamp 110 is installed in the support pole P, the pole-side clamp does not need to be separated from the support pole unless the macroscopic directivities of the antenna modules A1 and A2 need to be adjusted. Mounting using a simple method of using the hose band clamps 10A and 10B is more easy.

Band fixing holes 117 through which the hose band clamps 10A and 10B are horizontally inserted may be formed in the rear parts of the pair of pole-side clamps 110, respectively. More specifically, the band fixing hole 117 may be formed on the left or right at the rear part of the pole-side clamp 110 in a way to penetrate the pole-side clamp in an opposite direction thereof.

Furthermore, a gear panel assembly (reference numeral not indicated) having at least two gear teeth clamped with the outer circumferential surface of the support pole P formed therein may be combined with each of the upper and lower sides of the rear parts of the pair of pole-side clamps 110.

More specifically, as reference in FIGS. 8 to 12, the gear panel assembly may include at least one clamping gear panel 116 in which at least two gear teeth are formed and the two or more gear teeth are provided to be exposed toward the support pole P and a gear fixing panel 115 that fixes the clamping gear panel 116 to the top and bottom of the pole-side clamp 110.

The clamping gear panel 116 may be installed in a clamping gear panel installation groove 113-2 that is concavely formed on each of the upper and lower sides of the rear part of the pole-side clamp 110. The gear fixing panel 115 may be installed in a fixed panel installation groove 113-1 that is concavely formed on each of the upper and lower sides of the rear part of the pole-side clamp 110 so that the fixed panel installation groove includes the clamping gear panel installation groove 113-2.

As reference in FIG. 12, two clamping gear panel installation grooves 113-2 may be formed on the upper and lower sides of the rear part of the pole-side clamp 110 left and right, respectively, so that the two clamping gear panel installation grooves are isolated from each other at a predetermined distance. Two clamping gear panels 116 may also be provided and installed in the clamping gear panel installation grooves 113-2, respectively.

If the two clamping gear panels 116 are installed in the clamping gear panel installation grooves 113-2, the gear fixing panel 115 provided in a single number is seated and fixed to the fixed panel installation groove 113-1, and the two clamping gear panels 116 may be fixed thereto.

In this case, the clamping gear panel 116 may be horizontally provided rotatably around an arbitrary rotating point within the clamping gear panel installation groove 113-2. As the clamping gear panel 116 is rotated as described above, at least two gear teeth exposed to the rear of the pole-side clamp 110 are rotated along a circular trajectory, and the location of the gear teeth may be adjusted in accordance with various outside diameters of the support pole P.

Meanwhile, the gear panel assembly may further include a gear adjustment pin 118 that is fixed to the clamping gear panel installation groove 113-2 through the clamping gear panel 116 in order to restrict the rotation of the clamping gear panel 116.

In this case, a pin slot 119 through which the gear adjustment pin 118 penetrates is formed in the clamping gear panel 116 in an arc form so that the pin slot has the same radius. The location of the gear teeth may be adjusted within the range of the length of the pin slot 119.

Meanwhile, the gear fixing panel 115 may be seated in the fixed panel installation groove 113-1 so that the gear fixing panel covers the clamping gear panel 116 in the state in which the clamping gear panel 116 has been fixed to the clamping gear panel installation groove 113-2, and may be fixed thereto by multiple screws 114.

Meanwhile, the clamping apparatus 100 for the support pole of a radio unit according to an embodiment of the present disclosure may further include a clamping bolt 130 that penetrates the locking pad 121 over the locking pad 121 of the RU-side clamp 120 and that is bolted and fastened to the inside of the pole-side clamp 110 corresponding a lower part of the locking hole 111 of the pole-side clamp 110.

A male thread 131 may be formed at the lower part of the outer circumferential surface of the clamping bolt 130. A bolting fastening boss 112 in which a female thread (not illustrated) has been formed may be provided within the pole-side clamp 110 so that the clamping bolt 130 is bolted and combined with the bolting fastening boss.

The clamping bolt 130 is downward exposed through the locking pad 121. A penetration part 121-1 that is formed to be relatively thick and curvedly compared to other portions may be formed in the locking pad 121. A bolt through hole 121-2 is formed within the penetration part 121-1.

In this case, an incline that is inclined so that the width of the incline is gradually narrowed downward (the gravity direction) is formed in each of the lateral surface of the locking pad 121 and the inner surface of the locking hole 111. When the bolting fastening force of the clamping bolt 130 is delivered, the lateral surface of the locking pad 121 may be forcedly fitted to the incline, that is, the inner surface of the locking hole 111, so that shapes of the lateral surface of the locking pad and the incline are matched.

It is preferred that the incline of the locking pad 121 is slantly formed to have a curved surface having a parabola form not a complete straight-line form.

If the locking pad 121 has the incline in which the thickness of the locking pad 121 is curved and inclined in front and rear directions thereof as described above, there is a difference in the effect in which a moving phenomenon of the RU-side clamp 120, which occurs due to an external force such as external strong wind, can be prevented through a gap according to an assembly tolerance when the locking pad 121 is formed in the same thickness in both the front and rear directions in that the least bonding surface can be secured on the inner surface of the locking hole 111.

Figure 15:
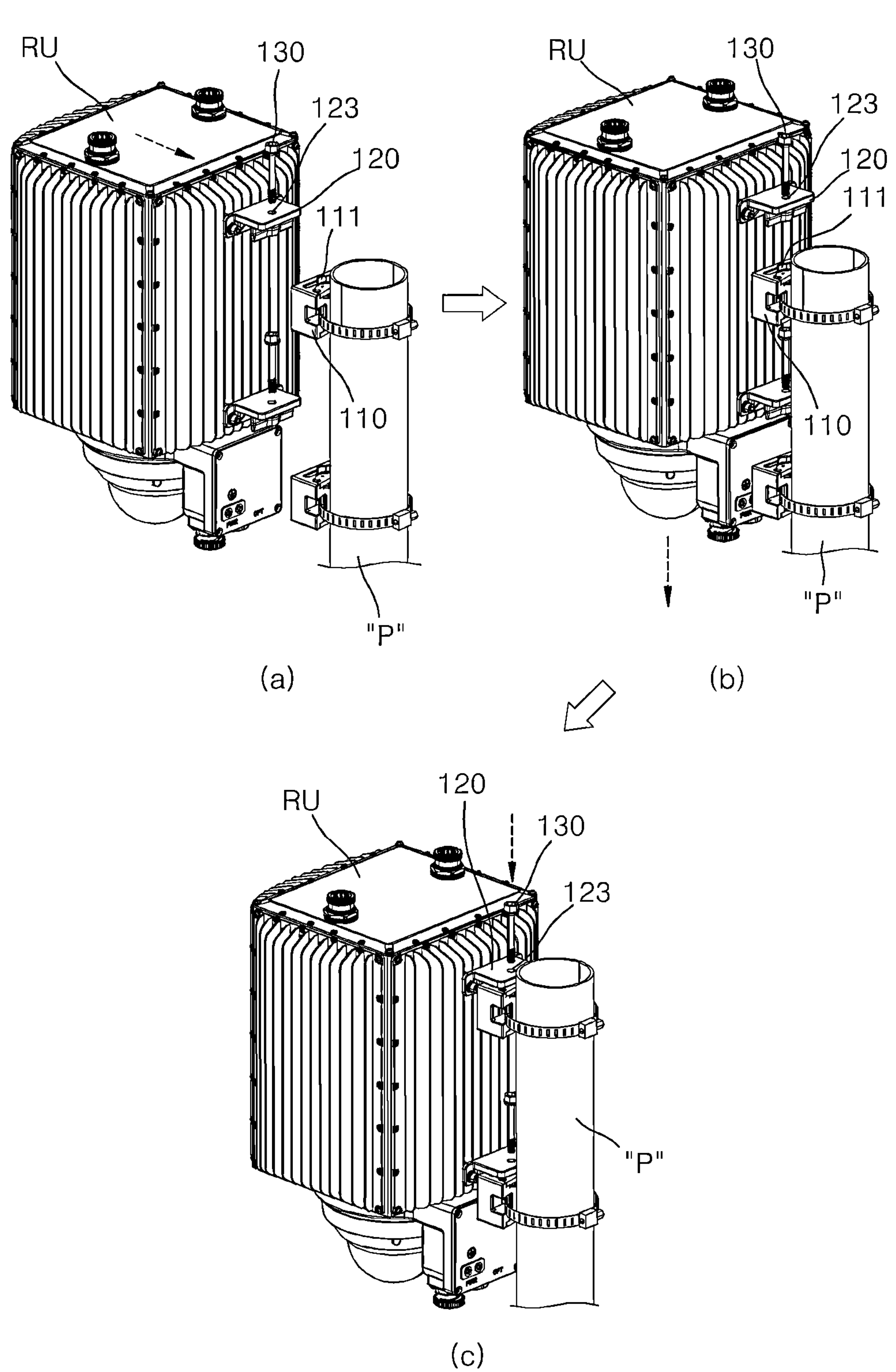
FIG. 15 is a perspective view of a process of installing the RU in the support pole according to an embodiment of the present disclosure.

FIG. 15 is a perspective view of a process of installing the RU in the support pole according to an embodiment of the present disclosure.

A process of installing the RU in the support pole P by using the clamping apparatus 100 for the support pole of a radio unit according to an embodiment of the present disclosure is described in brief as follows.

First, as reference in FIG. 15(*a*), the upper clamp 100A and the lower clamp 100B are installed in the support pole P by the hose band clamps 10A and 10B, and are fixed thereto through the band fixing hole 117 of the pole-side clamp 110.

In this case, an upper and lower separation distance between the upper clamp 100A and the lower clamp 100B needs to be adjusted in accordance with an upper and lower separation distance between the upper and lower RU-side clamps 120 that will be fixed to the RU mounted thereon.

Furthermore, the RU-side clamp 120 may be fixed by an operation of fastening the RU-side clamp to a bolt fastening hole RU-25 formed in the rear surface of the RU through the bolt through hole 125 formed in the RU-side clamp 120 by using a fixing bolt 127.

In such a state, as reference in FIG. 15(*b*), the RU is moved toward the support pole P. As reference in FIG. 15(*c*), after the locking hole 111 of the pole-side clamp 110 is disposed right below the locking pad 121 of the RU-side clamp 120, the locking pad 121 is fixed to the locking hole 111 by an operation of inserting and holding the locking pad in the locking hole by moving the locking pad downward.

There can be provided an advantage in that the safety of a site worker can be guaranteed because the site worker can conveniently fix the RU, that is, a relatively heavy body, to the pole-side clamp 110 as described above.

Furthermore, the clamping bolt 130 is downward fastened through a bolt fastening hole 123 formed in the upper surface of the RU-side clamp 120. The male thread 131 is bolted and combined with the bolting fastening boss 112 of the pole-side clamp 110.

At this time, the bolting fastening force of the clamping bolt 130 is delivered to the pole-side clamp 110 and the RU-side clamp 120, so that the locking pad 121 and the locking hole 111 can be firmly combined as shapes of the locking pad and the locking hole are matched in a forcedly fitting form.

In this case, the locking pad 121 has the incline having an inclined form so that the thickness of the locking pad in the front and rear directions thereof is gradually reduced in the direction of gravity. When the shape of the locking pad 121 is matched with the shape of the locking hole 111 in the forcedly fitting form, a flow phenomenon attributable to an external force (e.g., strong wind) can be prevented because the locking pad can secure the least bonding surface.

The clamping apparatus 100 for the support pole of a radio unit according to an embodiment of the present disclosure has advantages in that a worker can conveniently detachably install the RU at a desired location of the support pole P on the spot by using the hose band clamps 10A and 10B and an outward appearance of the place where the RU has been installed can be prevented from being degraded in that the exposure of a connection cable between the RU and the multiple antenna modules A1 and A2 to the outside is sublated to a maximum extent.

The clamping apparatus for the support pole of a radio unit according to an embodiment of the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the clamping apparatus for the support pole of a radio unit, which enables the RU to be easily detachably installed in the support pole, enables the directivity of the multiple antenna modules of a base station to be easily adjusted, and can prevent an outward appearance of the outside of the support pole from being degraded by sublating the exposure of the cable that electrically connects the radio unit and the antenna module to the outside.

The invention claimed is:

1. A clamping apparatus for the support pole of a radio unit, the clamping apparatus comprising:

a pole-side clamp fixed to a support pole and having a locking hole concavely formed downward from an upper surface thereof; and a radio unit (RU)-side clamp having a front part fixed to a RU and having a locking pad, which is inserted into a locking hole of the pole-side clamp from top to bottom and then fixed thereto, formed at a rear part thereof, wherein a thickness of the locking pad in front and rear directions thereof is slantly formed so that a front and rear width of the thickness is gradually narrowed in a direction of gravity

.

2. The clamping apparatus of claim 1, wherein:

the locking hole is formed to have an inner surface having a plane form, and the locking pad is formed to have a curved surface having a parabola form.

3. The clamping apparatus of claim 1, wherein the pole-side clamp is provided in the support pole as a pair so that the pair of pole-side clamps is isolated from each other up and down through a medium of hose band clamps.

4. The clamping apparatus of claim 3, wherein a band fixing hole into which the hose band clamp is horizontally inserted therethrough is formed in rear parts of the pair of pole-side clamps.

5. The clamping apparatus of claim 3, wherein a gear panel assembly in which at least two gear teeth clamped with an outer circumferential surface of the support pole has been formed is combined with each of upper and lower sides of the rear parts of the pair of pole-side clamps.

6. The clamping apparatus of claim 5, wherein the gear panel assembly comprises:

at least one clamping gear panel having the at least two gear teeth formed therein and having the two or more gear teeth provided to be exposed toward the support pole; and a gear fixing panel that fixes the clamping gear panel to a top and bottom of the pole-side clamp.

7. The clamping apparatus of claim 6, wherein:

the clamping gear panel is installed in a clamping gear panel installation groove that is concavely formed on each of the upper and lower sides of the rear parts of the pole-side clamps, and the gear fixing panel is installed in a fixed panel installation groove that is concavely formed on each of the upper and lower sides of the rear parts of the pole-side clamps so that the gear fixing panel comprises the clamping gear panel installation groove.

8. The clamping apparatus of claim 7, wherein:

the clamping gear panel is horizontally rotatably provided in the clamping gear panel installation groove, and the gear panel assembly further comprises a gear adjustment pin that is fixed to the clamping gear panel installation groove through the clamping gear panel in order to restrict a rotation of the clamping gear panel.

9. The clamping apparatus of claim 8, wherein:

a pin slot through which a gear adjustment pin penetrates is formed in the clamping gear panel in an arc form so that the pin slot has an identical radius, and a location of the gear teeth is adjusted within a range of a length of the pin slot.

10. The clamping apparatus of claim 7, wherein the gear fixing panel is screwed and fixed to a fixed panel installation groove so that the gear fixing panel covers the clamping gear panel in a state in which the clamping gear panel has been fixed to the clamping gear panel installation groove.

11. The clamping apparatus of claim 1, further comprising a clamping bolt that is bolted and fastened within the pole-side clamp corresponding to a lower part of the locking hole of the pole-side clamp through the locking pad on an upper surface of the locking pad of the RU-side clamp.

12. The clamping apparatus of claim 11, wherein when a bolting fastening force of the clamping bolt is delivered, a lateral surface of the locking pad is forcedly fitted into an incline of the locking hole so that shapes of the lateral surface and the incline are matched.

* * * * *